United States Patent [19]

Muramatsu

[11] Patent Number: 4,772,043
[45] Date of Patent: Sep. 20, 1988

[54] SUSPENSION FOR AUTOMOBILE

[75] Inventor: Tadao Muramatsu, Toyota, Japan

[73] Assignee: Toyota Jidosha Kabushiki Kaisha, Toyota, Japan

[21] Appl. No.: 32,526

[22] Filed: Apr. 1, 1987

[30] Foreign Application Priority Data

Apr. 3, 1986 [JP] Japan ................................. 61-75560

[51] Int. Cl.⁴ ............................................... B60G 3/18
[52] U.S. Cl. ..................................... 280/690; 280/701
[58] Field of Search ............... 280/688, 690, 691, 696, 280/701

[56] References Cited

U.S. PATENT DOCUMENTS

| 3,893,701 | 7/1975 | Kroniger | 280/690 |
| 4,537,420 | 8/1985 | Ito et al. | 280/696 |
| 4,681,342 | 7/1987 | Goerich | 280/690 |

FOREIGN PATENT DOCUMENTS

| 2818198 | 10/1979 | Fed. Rep. of Germany ...... 280/690 |
| 31-192805 | 6/1956 | Japan . |
| 54-38762 | 11/1979 | Japan . |
| 60-52107 | 4/1985 | Japan . |

Primary Examiner—Ross Weaver
Attorney, Agent, or Firm—Oblon, Fisher, Spivak, McClelland & Maier

[57] ABSTRACT

A suspension for an automobile is provided with a suspension arm for supporting an axle carrier. The suspension arm includes a pair of rigid arms disposed spaced from each other longitudinally of a car body each of which is pivotably connected on one end thereof to the car body and on the other end to the axle carrier and at least one coupling member stretched between these rigid arms and connected thereto. The coupling member is formed of a plate material and is deformable in a lateral direction parallel to a plane including centers of connection of the rigid arms to the car body and to the axle carrier.

8 Claims, 4 Drawing Sheets

FIG. I

SUSPENSION FOR AUTOMOBILE

BACKGROUND OF THE INVENTION

1. Field of the Invention:

This invention relates to a suspension for an automobile and, more particularly, to a suspension provided with a suspension arm connected pivotably to a car body at two connections spaced longitudinally of the car body from each other and supporting pivotably an axle carrier at two connections spaced from both said connections laterally of the car body.

2. Description of the Prior Art:

There has been proposed a suspension which is provided with a suspension arm connected pivotably to a car body through bushings at two front and rear connections and supporting pivotably an axle carrier at two front and rear connections, said suspension arm being generally L-shaped as viewed in plan (Japanese Patent Publication No. 38762/79). In this suspension are determined the positions of respective connections to meet such requirements that a straight line interconnecting the rear connection at the car body side and the rear connection at the axle carrier side is orthogonal to a center line of a wheel on a grounding surface and a straight line interconnecting the front and rear connections at the car body side is crossed at a predetermined angle to a center line of the car body, and so on.

In said suspension, when the spring constants of bushings disposed respectively at the front and rear connections at the car body side of the suspension arm are set to be soft to increase a longitudinal compliance, toe-out tendency of the wheel is increased when backward force such as braking force is applied to the wheel.

Also, when lateral force is applied to the wheel, the rear connection at the car body side of the suspension arm is offset rearward from a center of the axle carrier, so that the wheel has somewhat toe-in tendency. On the other hand, since the rear connection at the car body side of the suspension arm is restricted in its disposition, the degree of freedom of selecting toe characteristics of the wheel is few.

An independent suspension for a rear wheel described in Japanese Utility Model Public Disclosure (KOKAI) No. 192805/82 has one of bifurcated portions provided on a trailing arm and formed to be less deformable vertically and deformable laterally. Thus, problems similar to those of said suspension are encountered in that while controllability can be improved, displacements of the wheel in longitudinal and lateral directions are affected by the hardness of the bushings respectively disposed in the bifurcated portions and the hardness of bushings disposed on the car body side of a rod connected respectively with the trailing arm and the car body to regulate lateral movement of the trailing arm.

An independent suspension for a rear wheel described in Japanese Utility Model Public Disclosure No. 52107/85 includes a first rigid lateral link, a second rigid link disposed forwardly of the first lateral link and a member disposed slantwise and spanned between the first and second links, the member being connected on an outward end thereof to the first link and on an inward end to the second link and being formed such that it has sufficient elasticity longitudinally of a car body and high rigidity upwardly and downwardly.

According to the suspension, the connection between the inward end of the member and the second link is moved inwardly by deformation of the member when a backward force acts on a wheel suspended by the suspension. Thus, the toe-in tendency of the wheel can be obtained. However, the amount of the toe-in obtained is small because the inward movement of the connection is restricted. Further, there occurs substantially no toe-in, when a lateral force acts on the wheel, because the member resists deformation laterally.

SUMMARY OF THE INVENTION

An object of the present invention is to provide a suspension for an automobile which reduces the influence of spring constants of bushings disposed in connections of a suspension arm, thereby making it possible to select the toe characteristics of a wheel.

Another object of the present invention is to provide a suspension for an automobile which allows a large deformation of a suspension arm due to both longitudinal and lateral forces in order to give a wheel suspended a by the suspension large toe-in tendency.

According to the present invention, there is provided a suspension having a suspension arm for supporting an axle carrier in which said suspension arm is provided with a pair of rigid arms spaced from each other longitudinally of a car body each of which is pivotably connected on one end thereof to the car body and on the other end to said axle carrier and a coupling member stretched between these rigid arms and connected to both rigid arms, the coupling member being deformable itself in a substantially lateral direction parallel to a plane including centers of the connections of said pair of rigid arms to said car body and said axle carrier and less deformable in both longitudinal and upward and downward directions.

The suspension arm is connected on to a lower portion of the axle carrier and an upper portion of the axle carrier is connected to a so-called I-type arm, a so-called A-type arm such as bifurcated arm each having a shape itself known per se or a shock absorber.

When a backward force or lateral force is applied to a wheel supported by the axle carrier, the coupling member is deformed in the substantially lateral direction parallel to the plane including the centers of the connections of said pair of rigid arms to the car body and axle carrier to change the toe characteristics of the wheel.

The toe characteristics of the wheel are affected by the deformation of the coupling member rather than by spring constants of the bushings disposed in the connections of the suspension arm. Therefore, riding comfort and controllability are not adversely effected and the degree of freedom of selecting the toe characteristics is large.

BRIEF DESCRIPTION OF THE DRAWINGS

Other objects and features of the invention will become apparent from the following description of preferred embodiments of the invention with reference to the accompanying drawings, in which.

DESCRIPTION OF THE PREFERRED EMBODIMENTS

Figure 1:
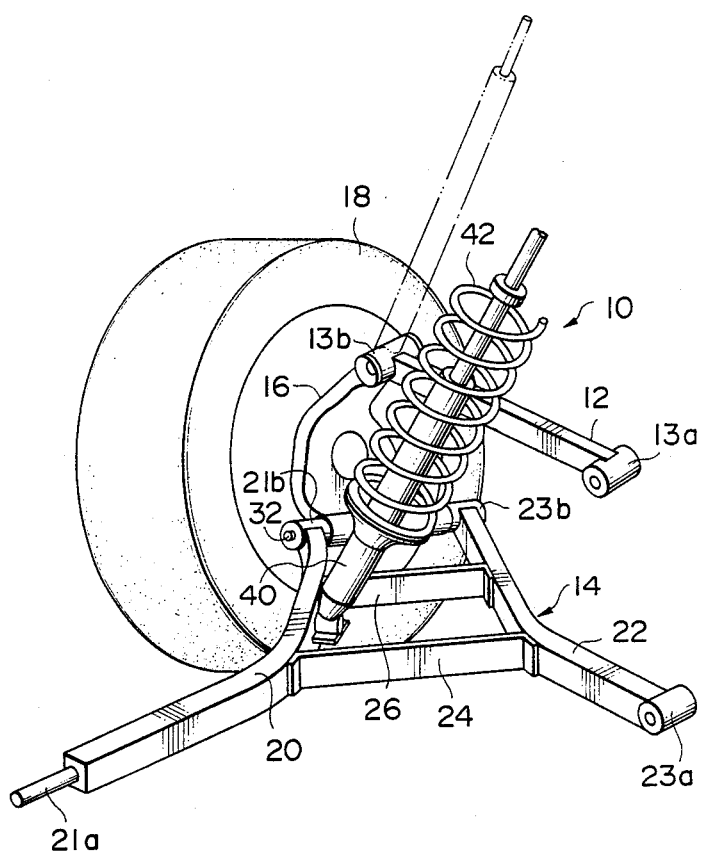
FIG. 1 is a perspective view showing a suspension.
Figure 2:
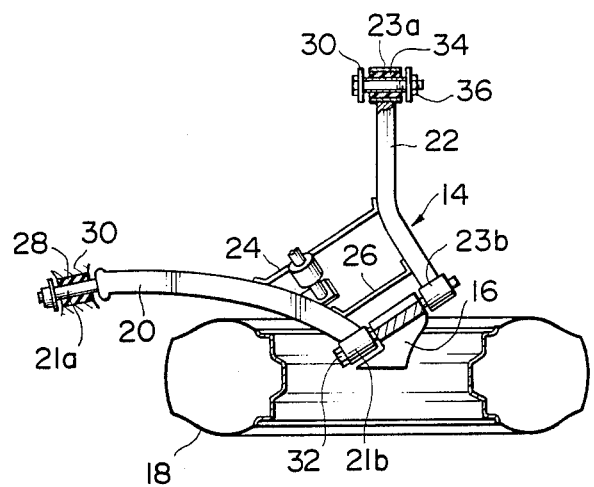
FIG. 2 is a plan view of a suspension arm showing connections in section.

A suspension 10 shown in FIGS. 1 and 2 supports an axle carrier 16 with suspension arms 12, 14 disposed above and below and a wheel 18 which is supported by the axle carrier 16.

The upper suspension arm 12 is a so-called I-arm and connected on an inner end 13a to a car body and on an outer end 13b to the axle carrier 16 through rubber bushings (not shown), respectively.

The lower suspension arm 14 is provided with a pair of rigid arms 20, 22 and coupling members 24, 26. The pair of the rigid arms 20, 22 are formed to have a sufficiently large longitudinal and lateral rigidity and are disposed so as to be spaced from each other longitudinally of the car body.

The front rigid arm 20 is formed to have generally arcuate shape as viewed in plan is disposed generally longitudinally of the car body. A front end 21a of the rigid arm 20 is formed as a shaft and, as shown in FIG. 2, is pivotably connected to a car body 30 through a bushing 28 which is formed of a material so as to be radially hard and axially soft. A rear end 21b of the rigid arm 20 is formed as an eye and is pivotably connected to the axle carrier 16 by a pin 32 through a rubber bushing or slide bushing (not shown) attached to the eye. The rear end 21b of the rigid arm 20 is coupled with the axle carrier 16 in front of a rotary axis of the wheel 18.

The rear rigid arm 22 is formed to have an obtuse angle shape as viewed in plan and is disposed generally laterally of the car body. An inner end 23a of the rigid arm 22 is formed as an eye and is pivotably connected to the car body 30 by a bolt and nut 36 through a rubber bushing 34 attached to the eye. The bushing 34 is formed so as to be radially hard. An outer end 23b of the rigid arm 22 is formed as an eye and is pivotably connected to the axle carrier 16 by a pin 32 through a rubber bushing or slide bushing (not shown) attached to the eye. The inner end 23a of the rigid arm 22 is located on the rotary axis of the wheel 18 and the outer end 23b is coupled with the axle carrier 16 on the rear portion of the rotary axis of the wheel.

The coupling members 24, 26 formed of plate materials are stretched between the front and rear rigid arms 20, 22 and welded thereto. The coupling members 24, 26 can be deformed in a substantially lateral direction parallel to a plane including centers of connection 21a, 21b, 23a and 23b in which a pair of rigid arms 20, 22 are connected to the car body 30 and axle carrier 16. However, the coupling members 24, 26 are hardly deformed in both longitudinal and upward and downward directions. In an embodiment shown in FIGS. 1 and 2, since the pair of rigid arms 20, 22 are positioned horizontally under the standard payload, the coupling members 24, 26 are deformed horizontally laterally. When a longitudinal force like braking force is applied to the wheel 18, a torsional force acts on the coupling members 24, 26. However, the coupling members resist sufficiently this torsional force without torsional deformation.

A shock absorber 40 is connected at a lower end thereof to the axle carrier 16 through a bushing (not shown) and disposed obliquely upward so as to be connected to an upper end to the car body through a bushing. A coil spring 42 is disposed so as to surround the shock absorber 40, thereby constituting the suspension 10.

Figure 3:
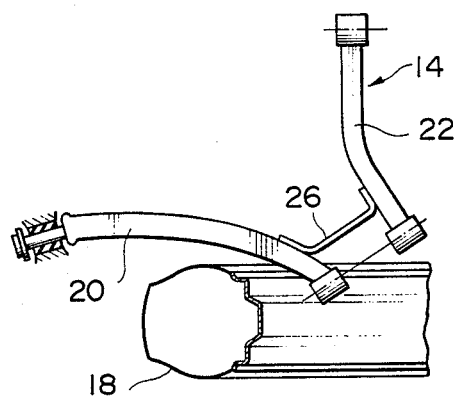
FIGS. 3 and 4 are plan views showing other embodiments of the suspension arm.

In the embodiment shown in FIG. 3, one coupling member 26 is stretched between the front and rear rigid arms 20, 22 and welded thereto. In this embodiment, when a longitudinal force is applied to the wheel 18, the coupling member 26 may be subjected to torsional deformation. In this case, a so-called A-type arm formed so to be bifurcated or diverged is used for the upper suspension arm 12 to receive the torsional force, thereby the torsional force hardly acts on the coupling member 26.

Figure 4:
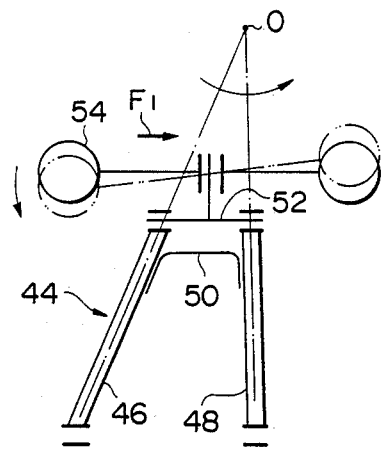

A suspension arm 44 shown in FIG. 4 is provided with rigid arms 46, 48 spaced from each other longitudinally of the car body and disposed to converge laterally outward and is also provided with a coupling member 50. Each of the rigid arms 46, 48 is connected on an inner end to the car body through a rubber bushing (not shown) and on an outer end pivotably to an axle carrier 52 through a rubber bushing or slide bushing. A rotary axis of a wheel 54 supported by the axle carrier 52 is located intermediate the front and rear rigid arms 46, 48. In this case, the A-type arm is used for the upper suspension arm.

Further in the embodiment shown in FIG. 1, the axle carrier 16 is supported by the suspension arms 12, 14 disposed above and below axle carrier 16. Instead of this constitution, the lower portion of the axle carrier 16 may be connected to the suspension arm 14 and the upper portion to a shock absorber shown by the phantom line in order to provide a MacPherson strut type suspension.

Operation of the embodiment

Figure 5A:
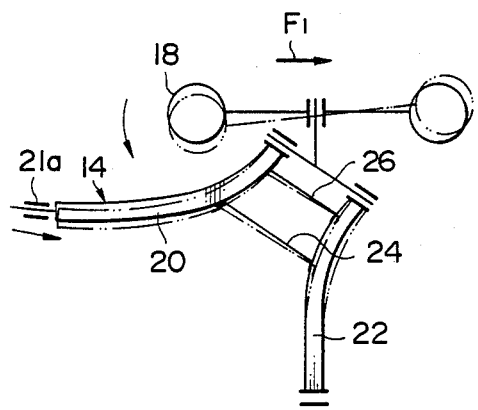
FIGS. 5a and 5b are plan views showing the operation of the present invention.

Upon application of a backward force to the wheel:

As shown by the phantom line in FIG. 5a, when a backward force $F_1$ acts on the wheel 18, the coupling members 24, 26 are deformed horizontally laterally and the rigid arms 20, 22 are displaced horizontally to receive the backward force. Since the bushing engaging the front end 21a of the rigid arm 20 is axially deformed, a toe-in tendency is somewhat generated while the change in toe of the wheel 18 can be cancelled as a whole according to the degrees of deformation of other bushings and coupling members 24, 26.

Even if the bushing engaging the front end 21a of the rigid arm 20 is selected so as to be radially hard and axially soft, i.e., even if the bushing is selected to improve the longitudinal compliance, no problem is encountered since the backward force is received by the deformation and/or displacement of the suspension arm 14. Thus, riding comfort can be improved.

Figure 5B:
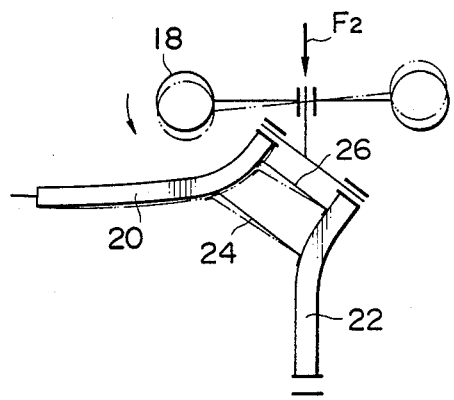

When a lateral force is applied to the wheel:

As shown in FIG. 5b, when a lateral force $F_2$ is applied to the wheel 18, the coupling members 24, 26 are deformed laterally and the front rigid arm 20 is displaced. At this time, the wheel 18 undergoes toe-in and the automobile presents the stable characteristics of understeering.

Figure 6:
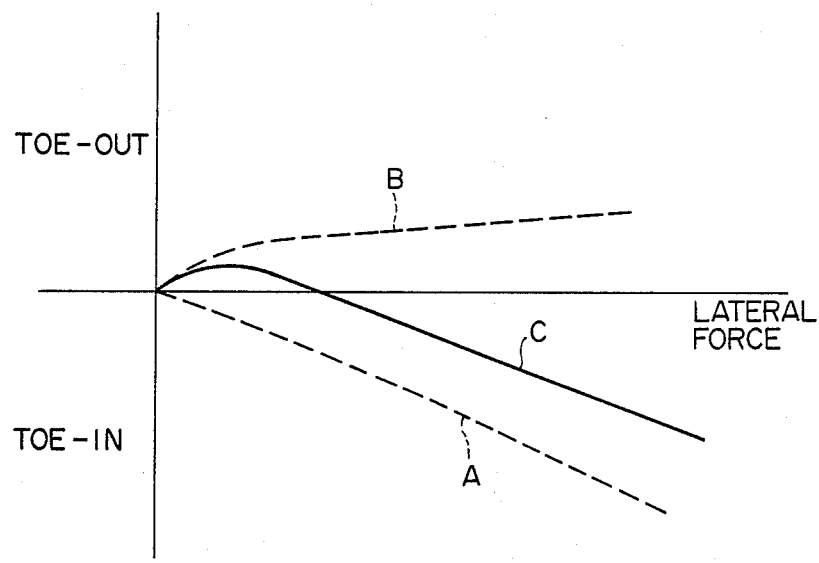
FIG. 6 is a characteristic diagram showing change in toe upon application of a lateral force.

In this case, as shown in FIG. 6, the displacement characteristics of the suspension arm is shown by A. On the other hand, the entire characteristics of the rubber bushing is shown by B. Therefore, the toe-in and toe-out as shown by the characteristics C can be obtained when the degree of deformation of the coupling members 24, 26 is combined with the characteristics of the rubber bushing.

In the suspension arm 44 shown in FIG. 4, when the backward force $F_1$ is applied to the wheel 54, a large longitudinal compliance can be obtained and the toe angle can be changed into toe-in due to the fact that an instantaneous rotary center 0 is outside the wheel 54 and that the coupling member 50 is intermediate the front and rear rigid arms 46, 48.

Obviously, numerous modifications and variations of the present invention are possible in light of the above teachings. It is therefore to be understood that within the scope of the appended claims, the invention may be practiced otherwise than as specifically described herein.

What is claimed is:

1. A suspension for an automobile, comprising: a suspension arm for supporting an axle carrier, in which said suspension arm includes a pair of rigid arms disposed so as to be spaced from each other longitudinally of a car body and each of which is pivotably connected on a first end thereof to the car body and on a second end thereof to said axle carrier and at least one coupling member stretched between said rigid arms and connected thereto, said at least one coupling member being deformable in a substantially lateral direction parallel to a plane including the centers of connection of said pair of rigid arms to said car body and said axle carrier and being less deformable in both longitudinal and upward and downward directions.

2. A suspension as claimed in claim 1, wherein said coupling member is formed of a plate material.

3. A suspension as claimed in claim 1, further comprising a rubber bushing wherein each of said rigid arms is connected to said car body through said rubber bushing.

4. A suspension as claimed in claim 3, wherein the connection of said front rigid arm to the car body is formed as a shaft extending generally longitudinally of the car body and the connection of said rear rigid arm to the car body is formed as an eye.

5. A suspension as claimed in claim 4, wherein said bushing disposed in the connection of said front rigid arm to said car body is formed to be radially hard and axially soft.

6. A suspension as claimed in claim 1, wherein said front and rear rigid arms are disposed such that an instantaneous rotary center is located outside a wheel supported by said axle carrier.

7. A suspension as claimed in claim 1, wherein the connection of said front rigid arm to said axle carrier is located in front of a rotary axis of a wheel supported by said axle carrier and the connection of said rear rigid arm to said axle carrier is in the rear of said rotary axis.

8. A suspension as claimed in claim 7, wherein the connection of said rear rigid arm to said car body is located on said rotary axis.

* * * * *